United States Patent
Vilkov (10) Patent No.: US 11,029,282 B2
(45) Date of Patent: Jun. 8, 2021

(54) LIQUID PHASE ION MOBILITY SPECTROMETER

(71) Applicant: Analytical Detection LLC, Mission Viejo, CA (US)

(72) Inventor: Andrey N. Vilkov, Aliso Viejo, CA (US)

(73) Assignee: Analytical Detection LLC, Mission Viejo, CA (US)

( * ) Notice: Subject to any disclaimer, the term of this patent is extended or adjusted under 35 U.S.C. 154(b) by 0 days.

(21) Appl. No.: 16/548,489

(22) Filed: Aug. 22, 2019

(65) Prior Publication Data
US 2020/0064308 A1 Feb. 27, 2020

Related U.S. Application Data

(60) Provisional application No. 62/722,732, filed on Aug. 24, 2018.

(51) Int. Cl.
| | |
|---|---|
| *H01J 49/00* | (2006.01) |
| *G01N 27/622* | (2021.01) |
| *H01J 49/04* | (2006.01) |

(52) U.S. Cl.
CPC ........ *G01N 27/622* (2013.01); *H01J 49/0031* (2013.01); *H01J 49/0431* (2013.01)

(58) Field of Classification Search
CPC ........ H01J 49/00; H01J 49/02; H01J 49/0031; H01J 49/0431; G01N 27/622
USPC .......................................... 250/281, 282, 287
See application file for complete search history.

(56) References Cited

U.S. PATENT DOCUMENTS

| | | |
|---|---|---|
| 6,277,258 B1 | 8/2001 | Ivory et al. |
| 7,071,465 B2 | 7/2006 | Hill, Jr. et al. |
| 7,414,242 B2 | 8/2008 | Hill, Jr. et al. |
| 7,777,180 B2 | 8/2010 | Hill, Jr. et al. |

(Continued)

FOREIGN PATENT DOCUMENTS

| | | |
|---|---|---|
| EP | 3054473 A1 | 8/2016 |
| EP | 3165914 A1 | 10/2017 |

(Continued)

OTHER PUBLICATIONS

International Search Report and Written Opinion of International Application No. PCT/US2019/047915, dated Nov. 19, 2019, 19 pp.

(Continued)

*Primary Examiner* — Jason L McCormack
(74) *Attorney, Agent, or Firm* — Shumaker & Sieffert, P.A.

(57) ABSTRACT

In general, a liquid phase ion mobility spectrometer is described in which ions in a drift chamber are pushed against an increasing retarding electric field by means of liquid flow. In some examples, a method comprises ionizing an analyte to generate ions; introducing the ions into a separation region of a drift chamber; directing, at a velocity, a liquid flow through the separation region to apply first forces to the ions within the separation region of the drift chamber; using an electric field with a non-zero gradient, applying second forces to the ions within a separation region of a drift chamber, the second forces counter the first forces; modifying at least one of the velocity or the electric field; and after modifying at least one of the velocity or the electric field, detecting the ions at an ion detector to generate a signal.

21 Claims, 8 Drawing Sheets

(56) References Cited

U.S. PATENT DOCUMENTS

| | | | |
|---|---|---|---|
| 7,838,826 B1 | 11/2010 | Park | |
| 8,766,176 B2 | 7/2014 | Park et al. | |
| 9,304,106 B1 | 4/2016 | Park et al. | |
| 9,546,980 B1 | 1/2017 | Rather et al. | |
| 2005/0109930 A1* | 5/2005 | Hill, Jr. | G01N 27/622 250/286 |
| 2005/0109931 A1* | 5/2005 | Schultz | H01J 49/0045 250/287 |
| 2016/0202211 A1 | 7/2016 | Guharay et al. | |
| 2017/0365454 A1* | 12/2017 | Wu | H01J 49/0027 |
| 2018/0158664 A1* | 6/2018 | Xu | G01N 27/44769 |
| 2019/0025254 A1* | 1/2019 | Fujita | H01J 49/061 |
| 2019/0237319 A1* | 8/2019 | Green | H01J 49/0031 |

FOREIGN PATENT DOCUMENTS

| | | |
|---|---|---|
| EP | 3252460 A1 | 12/2017 |
| GB | 2490410 A1 | 10/2012 |

OTHER PUBLICATIONS

Lamabadusuriya et al., "Band Broadening Phenomena in Liquid Phase Ion Mobility Spectrometry," Dissertation to Washington State University, Dec. 2014, 187 pp.

Michelmann et al., "Fundamentals of Trapped Ion Mobility Spectrometry," American Society for Mass Spectrometry, published online Oct. 21, 2014, 11 pp.

Shumate et al., "Coronaspray Nebulization and Ionization of Liquid Samples for Ion Mobility Spectrometry," American Chemical Society, vol. 61, No. 6, Mar. 15, 1989, 6 pp.

Tam et al., "Liquid phase ion mobility spectrometry," Analyst, May 22, 2011, 9 pp.

International Preliminary Report on Patentability from International Application No. PCT/US2019/047915, dated Mar. 11, 2021, 11 pp.

* cited by examiner

LIQUID PHASE ION MOBILITY SPECTROMETER

This application claims the benefit of U.S. Provisional Application No. 62/722,732, filed Aug. 24, 2018, the entire contents of which are incorporated by reference herein.

TECHNICAL FIELD

In general, the disclosure relates to ion mobility spectrometry.

BACKGROUND

Ion mobility spectrometry (IMS) separates ions based on the balance of two forces: (a) the electric field and (b) the drag force from collisions with buffer gas molecules.

In a classical Drift Time IMS (DT-IMS) approach, ions are pushed through a stationary gas by an electric field. The resolving power of the drift chamber alone (determined by the amount of electrical work done with respect to the gas flow) theoretically scales with the square root of voltage applied across the drift chamber. Consequently, the gain in resolving power in such systems typically is traded off against the size and weight.

In an alternative approach, ions are held stationary by an electric field against a counter-current of gas flow. This approach led to the development of trapped (t)-IMS.

Resolving power is arguably the most important parameter in any separation technique. The contemporary large-scale IMS systems are capable of achieving resolving power exceeding 100. Among commercial IMS systems, the highest resolving power has been demonstrated with trapped IMS (t-IMS) system with resolving power routinely exceeding 200 for large ions. This ultra-high resolution was achieved by lowering buffer gas pressure to 1 Torr and using an RF ion tunnel to confine ions in the radial direction. Ions are first introduced and trapped in a linearly increasing electric field region. Then, the ions are ejected from the drift chamber in decreasing mobility order by ramping down the retarding electric field.

Despite its tremendous potential, the t-IMS approach is not free from limitations. Extended scan durations (mandatory for achieving ultra-high resolution) can also lead to preferential ejection of ions of high mass-to-charge values due to radial ion cloud expansion (i.e. sensitivity loss) and significant RF heating (i.e. extensive ion fragmentation).

SUMMARY

In general, techniques are described whereby ions are allowed to first settle into steady-state positions according to their mobilities along a drift chamber before a scan starts, thereby eliminating the primary cause of band broadening observed in liquid-phase drift time IMS systems. Then ions are transferred along the drift chamber by varying the intensity of a retarding electric field and detected using an ion detector according to their mobility.

The techniques provide one or more technical improvements having at least one practical application. For example, the techniques may provide greatly improved resolving power to reveal new features not seen by traditional IMS analyzers. As another example, the techniques may reduce, and in some cases, minimize the activation of ion internal energy allowing the nascent conformations of proteins and protein complexes in solutions to be observed. In comparison with t-IMS, the proposed technology offers potentially higher resolving power on a comparable time scale. Unexpectedly, the simpler overall design, which has no RF circuits or expensive/bulky vacuum pumps, achieves a considerably better price/performance ratio.

The techniques are compatible with the 'gentlest' ionization methods available, making the techniques an ideal tool for studying large protein complexes with folded structures vulnerable to even minor alterations of ion internal energy. Analysis of such 'native-like' ions will allow the evaluation of structures and assemblies that reflect those in solution.

The techniques may therefore facilitate a hybrid between ion mobility and electrophoresis that not only inherits the advantages of both methods but also expands on the diversity of applications enabled by the use of the techniques.

In some examples, an ion mobility spectrometer comprises an ionization source configured to generate ions from an analyte; a drift chamber with a separation region configured to receive the ions; a flow controller configured to direct, at a velocity, a liquid flow through the separation region to apply first forces to the ions within the separation region of the drift chamber; an electric field controller configured to use an electric field with a non-zero gradient to apply second forces to the ions within the separation region of the drift chamber, the second forces counter the first forces; a computing device configured to modify one or more of (1) the velocity of the liquid flow by directing the flow controller to modify the velocity of the liquid flow, or (2) the electric field by directing the electric field controller to modify the electric field; and an ion detector configured to detect, after the modification of the one or more of the velocity of the liquid flow or the electric field, the ions to generate a signal.

In some examples, a non-transitory computer-readable medium comprises instructions for causing processing circuitry to perform, using an ion mobility spectrometer, operations comprising: ionizing an analyte to generate ions; introducing the ions into a separation region of a drift chamber; directing, at a velocity, a liquid flow through the separation region to apply first forces to the ions within the separation region of the drift chamber; using an electric field with a non-zero gradient, applying second forces to the ions within a separation region of a drift chamber, the second forces counter the first forces; modifying at least one of the velocity or the electric field; and after modifying at least one of the velocity or the electric field, detecting the ions at an ion detector to generate a signal.

In some examples, a method comprises ionizing an analyte to generate ions; introducing the ions into a separation region of a drift chamber; directing, at a velocity, a liquid flow through the separation region to apply first forces to the ions within the separation region of the drift chamber; using an electric field with a non-zero gradient, applying second forces to the ions within a separation region of a drift chamber, the second forces counter the first forces; modifying at least one of the velocity or the electric field; and after modifying at least one of the velocity or the electric field, detecting the ions at an ion detector to generate a signal.

These and other aspects of the techniques are evident in the drawings and in the description that follows.

BRIEF DESCRIPTION OF THE DRAWINGS

The above features, aspects, and advantages of the present invention will become better understood when the following detailed description is read in conjunction with the accompanying drawings.

DETAILED DESCRIPTION

The transitional term "comprising" is synonymous with "including," "containing," or "characterized by," is inclusive or open-ended and does not exclude additional, unrecited elements or method steps.

The transitional phrase "consisting of" excludes any element, step, or ingredient not specified in the claim, but does not exclude additional components or steps that are unrelated to the invention such as impurities ordinarily associated with a composition.

The transitional phrase "consisting essentially of" limits the scope of a claim to the specified materials or steps and those that do not materially affect the basic and novel characteristic(s) of the claims.

A drift chamber is an enclosure for transmitting charged species in which charged species and a liquid phase can be introduced and in which the liquid phase can flow and the charged species can exit. In a drift chamber, in the absence of either a gas, a liquid or an electric field, the charged species will experience no force within the drift chamber, and therefore no change in velocity. The word 'push' means the application of a stream of gas, a flow of liquid or an electric field to exert a force on a species.

An electrode is a conductor associated with a drift chamber through which an electric field can be generated that exerts an influence on charged species in a region of the drift chamber.

A liquid supply or liquid flow means a source of liquid that can be introduced and directed into a drift chamber to influence the transmittance of a charged species in the drift chamber. The velocity of the liquid flow is the change in the position of an average liquid molecule in the liquid flow over a period of time. The liquid supply may supply, for example, one or ore of benzene, toluene, tetrachloroethylene, anisole, liquid methane, hexane, hydrocarbon oils and mineral oils.

A potential means the energy per unit charge at a location, where the energy per unit charge is equivalent to the amount of work needed to move a unit charge from infinity to a specific point.

An electric field means the force per unit charge experienced by a charged species at a location, and is a vector field surrounding an electric charge that exerts a force on the charged species, attracting or repelling the charged species. A pushing electric field or a pushing DC electric field means an electric field which exerts a force on a charged species in the same direction as the velocity vector of the charged species. A retarding electric field or a retarding DC electric field means an electric field which exerts a force on a charged species in a direction opposite or otherwise counter to the direction of the velocity vector of the charged species. A retarding electric field or retarding DC electric field may also include an electric field which exerts a force on a charged species in a direction opposite or otherwise counter to a direction of another force exerted on the charged species, such as drag force by a liquid flow. Opposing or countering forces need not have vectors parallel and in an exact opposite direction, but the forces counteract one another in at least one dimension.

The electric field in a drift chamber can be 'divided up' or 'partitioned' using potentials applied at different positions in the drift chamber to define different electric fields which will act on charged species in the partitions. For example, a drift chamber can be partitioned into two (2) partitions, where a first partition has a non-zero electric field component in the direction of the velocity vector of a charged species, and a second partition has a non-zero electric field component in the direction opposite to the direction of the velocity vector of the charged species. Here 'opposite to the direction' may refer to when the electric field component is one hundred and eighty (180) degrees to the direction of the velocity vector of the charged species.

An electric field has an intensity that is defined as the electric force per unit charge experienced by the charged species.

An electric field gradient (EFG) means the rate of change of an electric field generated by an electronic charge distribution. An EFG plateau corresponds to a region with a constant electric field gradient at any fixed moment of time. A radioactive ionization source such as Nickel 63, Americium 241 or Californium 252 are examples of an electric field free ionization source.

An electric field increasing in a first direction means the electric force per unit charge experienced by a charged species increases as the charged species moves in the first direction. This can be accomplished for example by placing electrodes in a drift chamber with one or more electrodes at a first potential at a first point in the drift chamber and one or more electrodes with potentials greater than the first potential at a second point where a vector from the first point to the second point is in the first direction.

Ion trapping means an accumulation of ions for a period of time.

Ion separation means a separation or division of a plurality of non-identical ions either in space or in time based on their physical or chemical properties.

A cross section means for a particle colliding with buffer media (i.e., gas and/or liquid) particles, the collision cross section corresponds to the area of the base of a cylinder aligned along the velocity vector of the particle.

Radial confinement of ions using RF fields is the only known way to counteract radial expansion in the gas phase in the modern IMS systems including t-IMS, travelling wave IMS and Structures for Lossless Ion Manipulations (SLIM). However, RF fields can confine ions only at pressures below approximately 30 Torr. An alternative approach was suggested to fill a drift chamber with a non-polar liquid such as hexane reducing ion diffusion by a factor of 1,000. Several modifications of liquid phase IMS system (all based on a classical gated Drift Time IMS approach) have been built and tested, however, resolving power of only 20 or less has so far been achieved. Such low resolution was explained to be due to coulombic repulsion in the liquid phase as the primary cause of band broadening. Because of very low mobility values, ions are stacked together either in the vicinity of the ion gate (liquid phase only design) or at the gas/liquid interface causing Coulomb repulsion.

Figure 1:
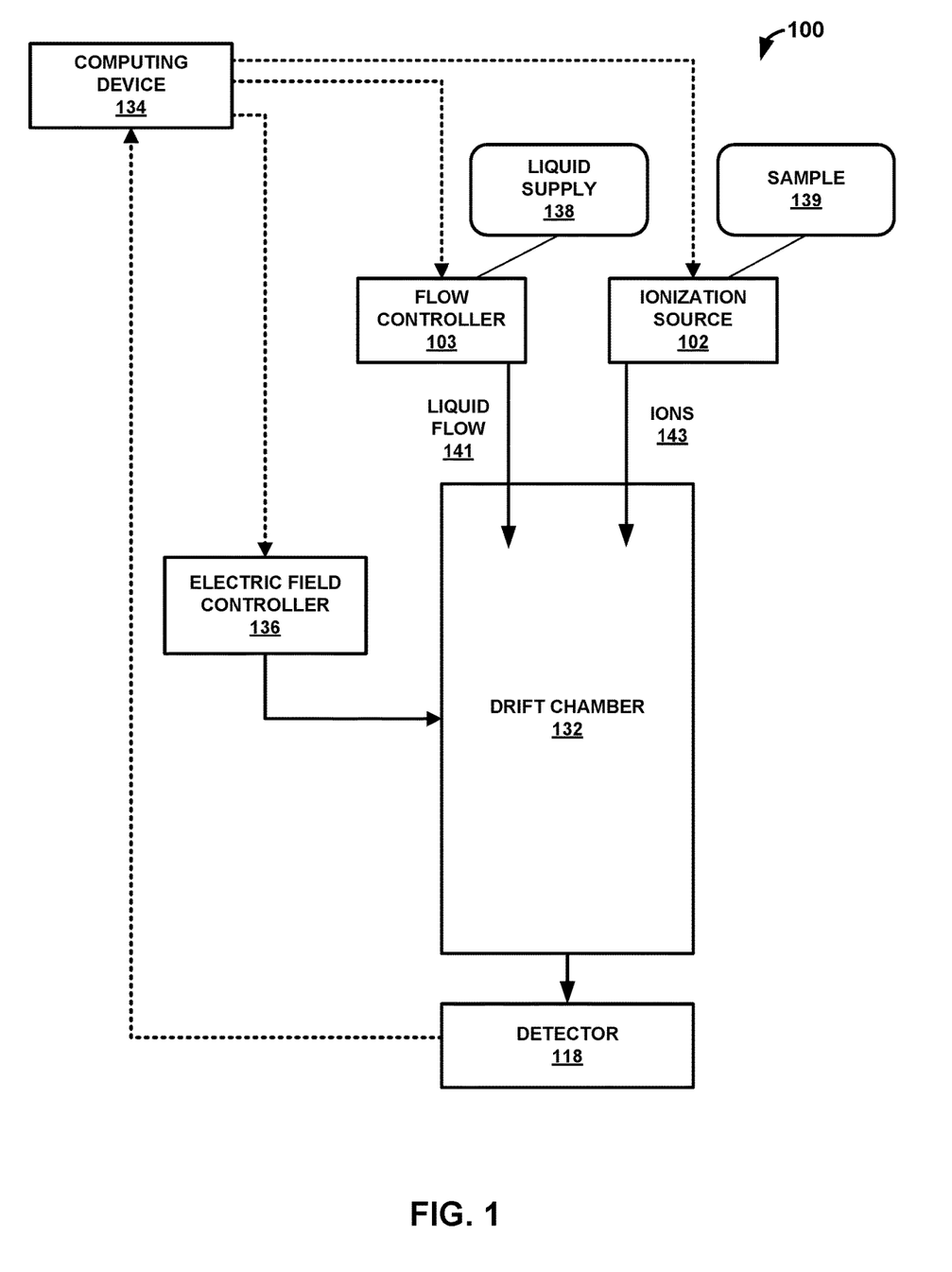
FIG. 1 schematically illustrates an example IMS system according to the techniques of this disclosure.

FIG. 1 schematically illustrates an example IMS system 100 according to the techniques of this disclosure. System 100 includes ionization source 102, ion detector 118, drift chamber 132, computing device 134, electric field controller 136, flow controller 103.

Ionization source 102 includes a device configured to convert electrically neutral particles into charged particles. For example, ionization source 102 may include an electrospray ionizer configured to apply a relatively high voltage to a liquid to produce an aerosol of charged particles, ions 143.

In some examples, ion detector 118 includes one or more electrodes and a sensing device configured to determine a change in the electric current of the one or more electrodes when a charged particle strikes the electrode(s). Ion detector 118 may represent a Faraday plate or a mass spectrometer, for instance. Ion detector 118 may be configured to generate and output a signal or other data, such as to computing device 134, in response to detecting an ion. The combination of signals generated for multiple ions presents a spectrum of ions 143 detected at ion detector 118 according to their mobility through drift chamber 132.

Drift chamber 132 is a housing defining an internal volume, in which different ionized particles may be distinguished according to their respective physical and/or chemical properties. In some examples, drift chamber 132 may have a substantially cylindrical shape, however, drift chamber 132 may include any adequate shape defining an internal volume.

Computing device 134 may include a memory and processing circuitry configured to perform the techniques of this disclosure. For example, computing device 134 may be configured to control one or more of ionization source 102, an electric field such as by controlling electric field controller 136, and/or liquid flow 141 such as by controlling flow controller 103. Control and other operations attributed to computing device 134 may be distributed among multiple computing devices. Computing device 134 may represent a server, workstation, laptop, portable device, control system, or other computing device.

Flow controller 103 may represent any device for controlling a flow of liquid through drift chamber 132. Flow controller 132 may represent a pump, a flow restrictor, a configurable aperture, or other type of flow controller. Flow controller 132 may be communicatively coupled to computing device 134.

In some examples, drift chamber 132 is oriented vertically to accommodate a gravity-fed liquid flow. In such examples, flow controller 103 may represent an aperture, pipe, flow restrictor or other device to control a volume or rate of gravity-fed liquid flow 141 from liquid supply 138. A pump may recirculate liquid flow 141 that has exited drift chamber 132 to liquid supply 138 in some examples. Drift chamber 132 may be oriented in other orientations.

Computing device 134 may also be configured to receive a signal, e.g., data, indicative of detected ionized particles from detector 118.

Electric field controller 136 is a device for controlling, e.g., vary, the magnitude of electric fields within drift chamber 132. In some example, electric field controller 136 is integrated within computing device 134. In other examples, electric field controller 136 represents distinct device having one or more manual input devices (e.g., keys, dials, levers, buttons, touchscreens, etc.) configured to change the strength of a magnetic field. Electric field controller 136 may be an analog voltage output card or apparatus, communicatively coupled to and/or a component of and controllable by computing device 134. Electric field controller 136 may be a programmable device capable of varying output voltages over time. Electric field controller 136 may have one or more analog voltage output lines connected to one or more electrodes adjacent to drift chamber 132 so as to create an electric field profile laterally across at least a portion of drift chamber 132.

Liquid-phase medium supply 138 includes a source of a liquid medium, such as benzene, toluene, tetrachloroethylene, anisole, liquid methane, hexane, or hydrocarbon oils and mineral oils. In this example, flow controller 103 is configured to pass a liquid medium from liquid-phase medium supply 138 through the internal volume of drift chamber 132 in order to exert a force on one or more ions 143 in drift chamber 132 toward ion detector 118.

In some examples in accordance with this disclosure, a user or apparatus may introduce sample 139 into ionization source 102, which ionizes a sample of particles from the sample 139 for introduction into drift chamber 132. The various ions 143 may settle into different steady-state positions within drift chamber 132, balanced between the drag force on the ions' masses from a flow of liquid from liquid supply 138, and the electromagnetic forces on the ions' electric charges from the variable-strength electric field laterally across the drift chamber 132. Once ions 143 have separated into steady-state positions according to their respective masses and charges (e.g., mass-to-charge ratios), computing device 134 may direct electric field controller 136 to modify the electric field to modify the electromagnetic forces applied to ions 143. For example, electric field controller 136 may reduce the electric field across at least a portion of the drift chamber 132, allowing the liquid flow to push one or more clusters of similar-propertied ions toward detector 118. Detector 118 detects ions 143 over time to generate signal usable for creating a ion mobility spectrum for ions 143, the signal for which may be sent to computing device 134.

In some examples in accordance with this disclosure, the forces applied by the electric field across drift chamber 132 to ions 143 may instead be in the direction of detector 118, and a velocity of the liquid flow 141 may be in a direction away from detector 118. In such cases, once ions 143 have separated into steady-state positions according to their respective masses and charges (e.g., mass-to-charge ratios), computing device 134 may direct electric field controller 136 to increase the electric field across at least a portion of the drift chamber 132, allowing the liquid flow to push one or more clusters of similar-propertied ions toward detector 118.

In some examples in accordance with this disclosure, in addition or alternatively to system 100 modifying the electric field, flow controller 134 may vary liquid flow 141. For example, computing device 134 may direct flow controller 103 to increase a rate of liquid flow 141 to push one or more clusters of similar-propertied ions toward detector 118 or, where the flow direction is reversed decrease a rate of liquid flow 141 to allow the electric field to push one or more clusters of similar-propertied ions toward detector 118.

Figure 2:
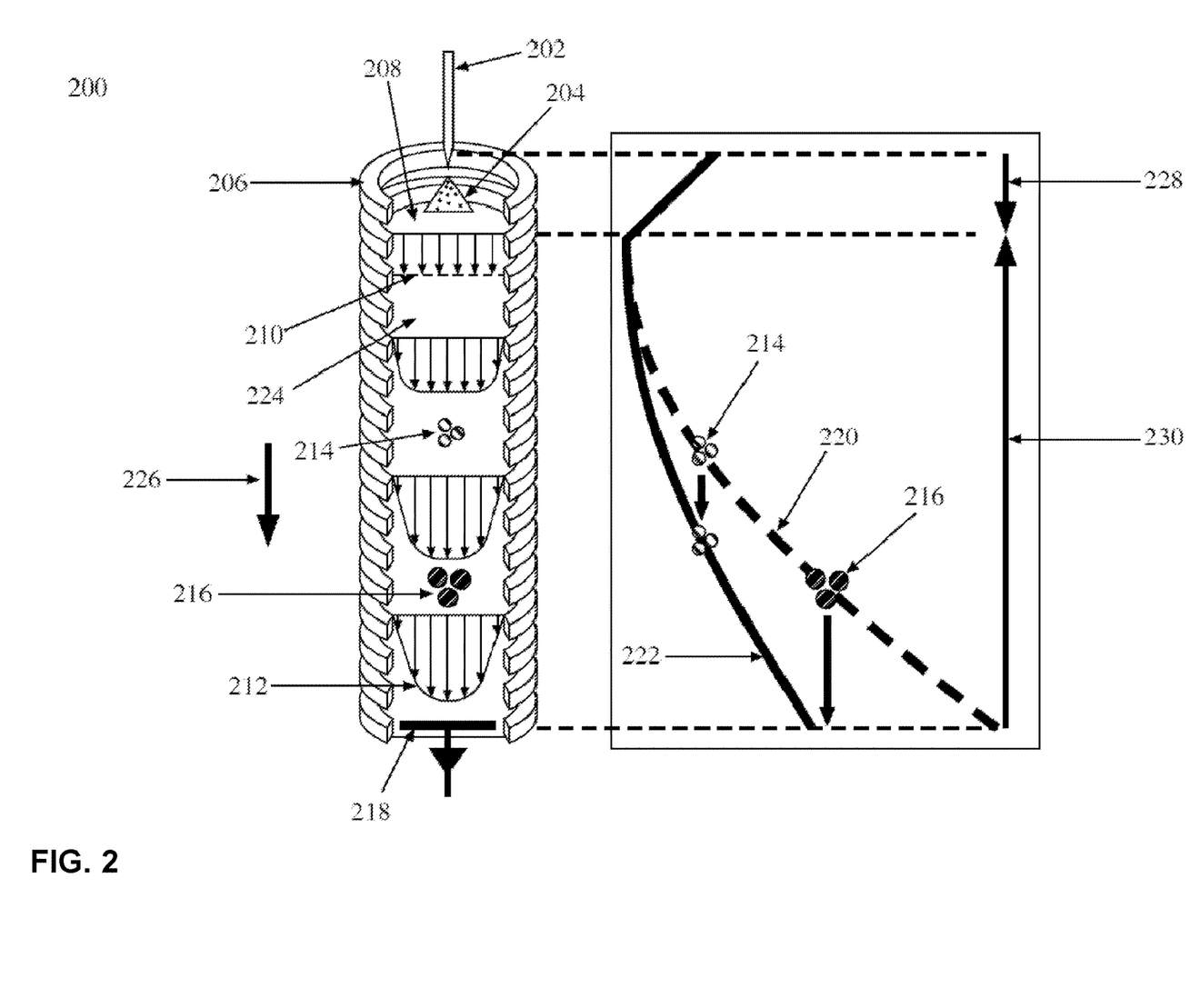
FIG. 2 shows the schematics of an exemplary IMS system including an electrospray gas phase ionization source, a gas-liquid interface, a drift chamber filled with a liquid and an ion detector, according to the techniques of this disclosure.

FIG. 2 depicts an example of a liquid phase IMS 200 according to techniques of this disclosure. IMS 200 may represent an example instance of components of system 100 of FIG. 1. Pulsed nano-spray ionization is employed at low flow rates from 10 to 100 nL/min with an emitter tip 202 which has a diameter of between approximately 5 μm and approximately 10 μm. This range approximately indicates a diameter of plus or minus twenty (20) percent. The emitter tip 202 generates a plume 204 which has a size of between approximately 100 microns and approximately 500 microns. This range approximately indicates a size of plus or minus fifty (50) percent. Emitter tip 202 may be part of or receive ions from an ionization source.

Ions with higher mobility 214 and ions with lower mobility 216 generated in the gas phase in the vicinity of the emitter tip 202 are transferred to the liquid phase 224 by an electric field in the pre-separation region 228 through a gas/liquid interface 208. The direction of an electric field is reversed within the drift chamber partition filled by a liquid 224, where ions are pushed now by the direction of the liquid flow 226 against the increasing electric field in the separation region 230. In some examples, the liquid flow is introduced in the pre-separation region 228 after the ionization source.

The ions with high mobility 214 are biased towards the ionizer 202 and ions with lower mobility 216 are biased towards the ion detector 218 as a result of a balance between the ascending electric field applied to a plurality of conductive electrodes 206 and the liquid flow 226. The desired electric field profile 220 applied to a plurality of conductive electrodes 206 may be set by a resistor ladder or by a set of voltages separately applied to the electrodes 206.

In some examples, after a certain time interval referred to as the ionization period, the ionizer 202 is deactivated. In some examples, after another time interval required for ions to reach their equilibrium positions, the ascending electric field in the separation region 230 applied to the plurality of conductive electrodes 206 is reduced to allow ions 216 and then 214, by way of example, to strike an ion detector 218 when the desired electric field profile 222 is reached. Ions arrive at the ion detector 218 in order of decreasing mobility. The electric field profiles 220, 222 have non-zero gradients such that the force applied to a charge at one lateral position in the drift chamber is different than the force applied to the same charge at another lateral position. In the illustrated example, electric field profiles 220, 222 increase the magnitude of the electric field along a curve from the inlet to toward the detector. The shape of electric field profiles 220, 222 may be configurable using computing device 134 or by otherwise programming electric field controller 136. For example, a user may enter a curve shape, order of a polynomial, coefficients, or may draw a curve using an interface. Computing device 134 programs the curve into the electric field controller 136 to configure the electric field profiles 220, 222 for the electric field across the drift chamber.

A laminar flow regime is expected. The axial velocity profiles are continuously developing from a uniform plug flow 210 towards a parabolic flow with a flat central section 212. In some examples, the pure parabolic profile is not developed.

In some examples, the IMS drift chamber is oriented vertically to accommodate a gravity-fed liquid flow. In some examples, the IMS drift chamber is oriented horizontally with lateral introduction of ions.

Estimate for Resolving Power

In a single dimensional geometry the resolution may be estimated using the formula shown in Equation (1):

$$R = v_g \cdot \sqrt[4]{\frac{2 \cdot L_p}{\beta}} \cdot \frac{1}{\sqrt[4]{K^3}} \cdot \sqrt{\frac{q}{16 \cdot \ln 2 \cdot k_b \cdot T}} \tag{1}$$

where $v_g$ is the gas velocity, $L_p$ is the length of the plateau region, $\beta$ is the electric field scan rate, q is a charge of ion, T is temperature of drift gas, $k_b$ is the Boltzmann constant.

The time required for ions to traverse the electrical field gradient (EFG) plateau, $t_p$, is given by:

$$t_p = \sqrt{\frac{2 \cdot L_p}{K \cdot \beta}}. \tag{2}$$

To compare theoretical resolutions of some examples of the techniques with t-IMS system, assume that the dimensions (length and diameter) and scan duration are the same. Then, combining equations (1) and (2) generates $$\frac{R_{liquid}}{R_{air@1mbar}} = \frac{v_{liquid}}{v_{air@1mbar}} \cdot \sqrt{\frac{K_{air@1mbar}}{K_{liquid}}}. \tag{3}$$

The Mason-Schamp equation relates ion mobility to the charge and size of the ion:

$$K = \frac{3}{16 \cdot N} \cdot \frac{q}{\Omega} \sqrt{\frac{2\pi}{\mu k_b T}} \tag{4}$$

where N is the number density, μ is the reduced mass and Ω is the collision cross section of the ion. Using equation (4) the ratio of ion mobilities in benzene to air at 1 mbar pressure may be estimated as follows:

$$\frac{K_{air@1mbar}}{K_{benzene}} = 6.86 \cdot 10^5 \tag{6}$$

With kinematic viscosity of benzene at 302° C. of $6.509 \cdot 10^{-7}$ m²/s and drift cell diameter of 8 mm, the linear flow velocity of 18 cm/s corresponds to about Reynolds number (Re) of 2212. Then, using equation (3), the predicted improvement in theoretical resolution limit is estimated to be:

$$\frac{R_{benzene}}{R_{air@1mbar}} = \frac{0.18}{130} \cdot \sqrt{6.86 \cdot 10^5} = 114\%. \tag{7}$$

As can be seen from equations (3) and (4) the use of thicker media such as mineral oils leads to higher theoretical resolution limits with correspondingly lower Reynolds numbers.

Fluid Dynamics

In some examples, the IMS resolving power is a function of drag force from collisions. Consequently, it is essential to keep the drag force nearly constant across the Electric Field Gradient (EFG) plateau. Consider around pipe of diameter D as a generic model for analysis of fluid dynamics within the drift chamber. The flow can be laminar or turbulent. In either case, the profile develops downstream over several diameters called the hydrodynamic entry length $L_h$, which is given approximately as $$L_h = 0.05 \cdot Re \cdot D. \tag{8}$$

TABLE 1

Estimates for hydrodynamic entry lengths.

| | Re | D, mm | $L_h$, mm |
|---|---|---|---|
| Techniques described in this disclosure | 2212 | 8 | 885 |
| t-IMS system | 150 | 8 | 60 |

Figure 3:
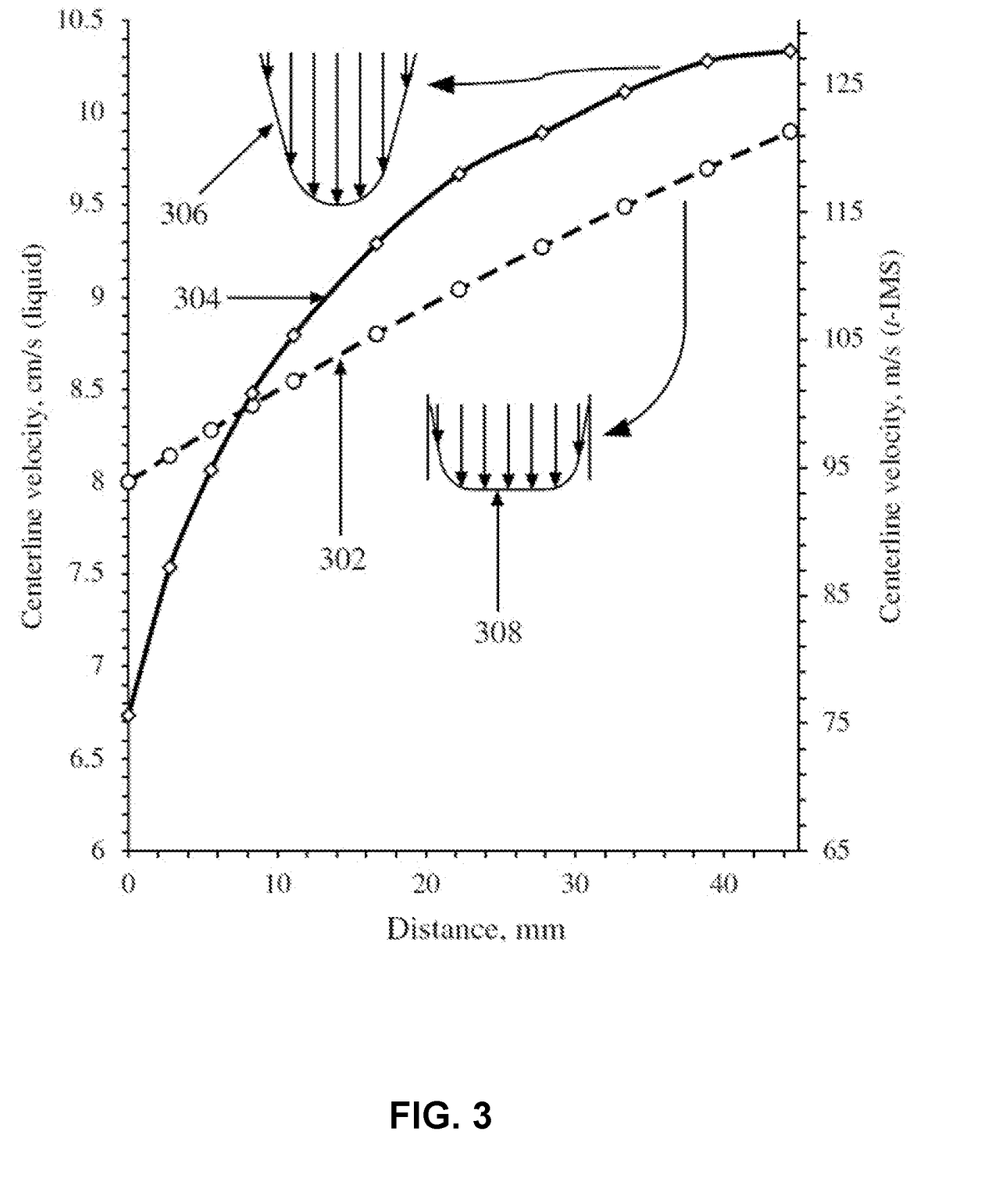
FIG. 3 shows the theoretical/simulated dependence of axial centerline velocity with corresponding radial velocity profiles at a distance of approximately 35 mm, according to the techniques of this disclosure.
Figure 4:
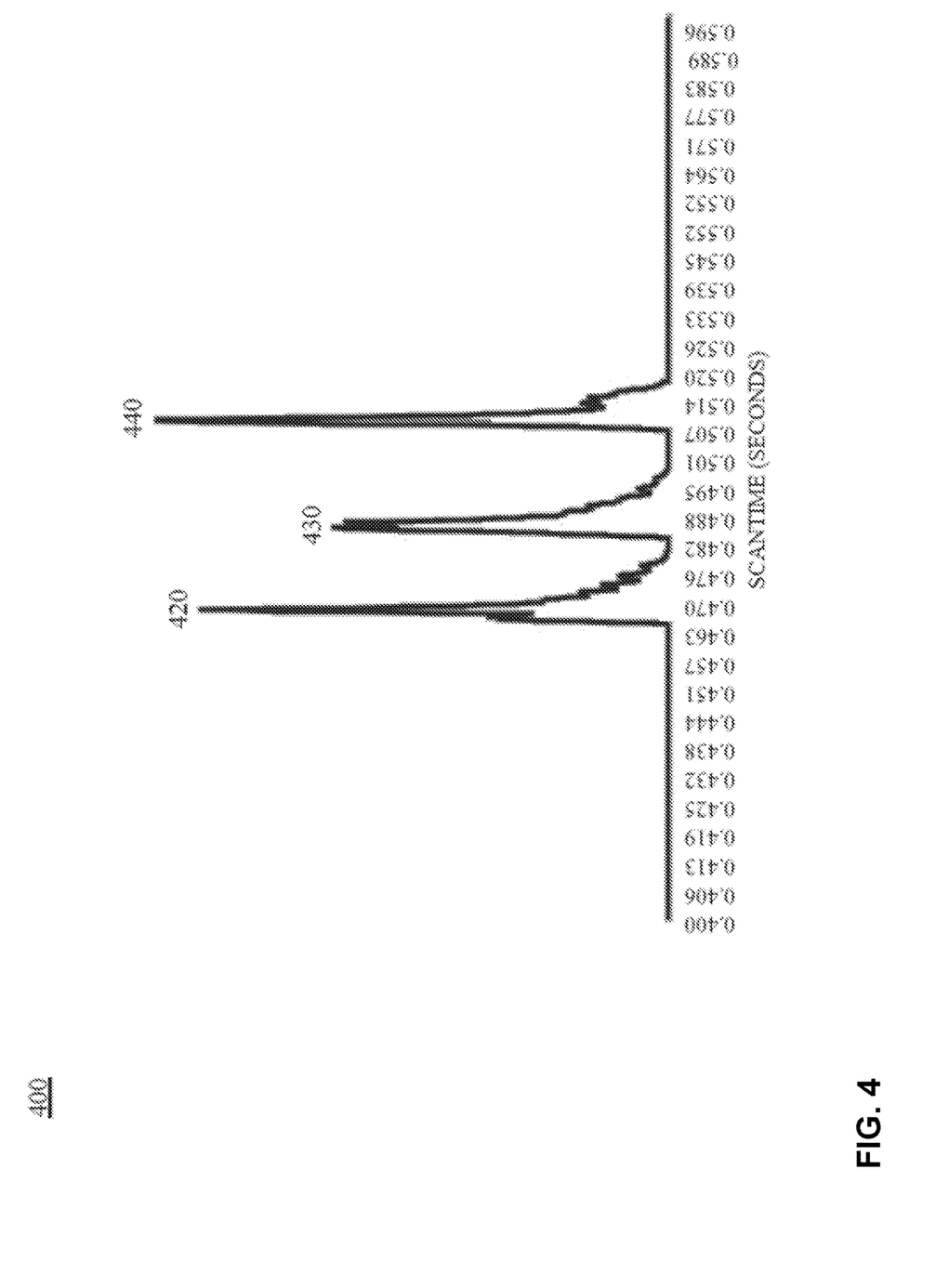
FIG. 4 shows the simulated plasmagram for ion mobility separation of maltotriose, melezitose and raffinose using benzene as liquid phase media, according to the techniques of this disclosure.

As seen from Table 1 and FIG. 3, in the t-IMS system, a fully developed laminar flow 306 with a nearly perfect parabolic profile is formed at the end of the EFG plateau. In contrast, in an embodiment of the present disclosure due to a large Reynolds number, the velocity flow profile 308 has a parabolic shape with a flat central section where the flow is still uniform. The embodiment used for simulations described in Table 1 and FIGS. 3 and 4 is explained below This discovery leads to two key advantages. Firstly, a nearly uniform velocity flow profile is kept across the whole length of the drift chamber except for a thin boundary layer. Uniform ('plug') flow corresponds to a radial profile with constant axial velocity (and, as a result, drag force) that is a key requirement in the absence of radial ion focusing. Secondly, in relatively short pipes it is possible to maintain laminar flow up to very large Reynolds numbers, 50,000 or more. Higher Reynolds numbers enable potentially faster scans and higher resolving power. FIG. 3 shows theoretical/simulated results obtained using parameters derived from an embodiment of the present disclosure (302 and 308) vs. published prior art theoretical/simulated results (304 and 306).

Another benefit of various embodiments of the present disclosure is the reduced variation of axial velocity along the center line 302 (~8.2%) in comparison with published results for t-IMS system 304 (~8.7%) as shown in FIG. 3.

Estimate for Electric Field

The electrospray ionization normally produces multiply-charged ions effectively extending the effective mass range of an instrument. Table 2 provides estimations for ion mobilities in benzene of several common proteins based on their published collisional cross sections. It is not unreasonable to restrict mobility range to $1.5 \cdot 10^{-3}$ cm$^2$/V·s as a low limit ($K_{min}$).

TABLE 2

Estimations of ion mobility K in benzene at room temperature for several proteins based on their CCS values using the Mason-Schamp equation.

| Protein | Mass (kDa) | Charge state (median) | CCS (m$^2$), $10^{-17}$ | K (cm$^2$/V · s) × $10^{-3}$ |
|---|---|---|---|---|
| Ubiquitin | 8.6 | 6 | 1.0 | 2.93 |
| Apomyoglobin | 17 | 22 | 5.0 | 2.15 |
| BSA | 66 | 17 | 4.4 | 1.78 |
| GroEL | 801 | 70 | 21.0 | 1.63 |

Then, the maximum required electric field E applied across the drift chamber may be estimated as follows:

$$E_{max} = \frac{v_{benzene}}{K_{min}} = \frac{18 \text{ cm/s}}{1.5 \cdot 10^{-3} \text{cm}^2/\text{V} \cdot \text{s}} = 12 \text{ kV/cm}. \tag{5}$$

In an embodiment of the present disclosure, substantially higher electric fields are required compared with traditional drift time IMS systems. However, in an embodiment of the present disclosure, substantially lower electric fields are required compared with high resolution Field Asymmetric (FA-) IMS systems, which have electric fields commonly exceeding 60 kV/cm.

In contrast to electrophoresis, where the high electric fields applied can cause substantial peak broadening due to Joule heating, in the proposed system ions are moving in a non-electrolyte media where Joule heating is a non-factor. Therefore, the maximum strength of the electric field applied is not restricted by the broadening effect, but only by engineering constraints.

Ion Trajectory Simulations

To demonstrate the feasibility, a preliminary evaluation was carried out using computer-based simulation tools. Custom designed in-house ion trajectory simulation software was fed with a potential array file generated by the Simion 8.1 software package. The gas flow profile here is assumed to be uniform. The drift chamber (4 cm long and 8 mm in diameter), consists of 23 ring electrodes, where the electrodes #1, 12 and 23 incorporate flat grids with high transmission transparency. An axial EFG increases linearly between electrodes #1 and #12, then stays constant between electrodes #12 and #23. During the initial accumulating time period, ions are distributed between electrodes #1 and #12 according to their mobilities. Then, the DC potentials (applied to each electrode) are ramped down linearly in time so that ions enter and traverse the EFG plateau (located between electrodes #12 and #23) in order according to their mobilities (from low to high, i.e. in order opposite to Drift Time IMS).

TABLE 3

Estimations of ion mobility K in benzene at room temperature for selected trisaccharides.

| Compound | CCS (Å$^2$) | K (in benzene) × $10^{-3}$ (cm$^2$/V · s) |
|---|---|---|
| Raffinose | 209.818 | 2.329 |
| Melezitose | 202.214 | 2.416 |
| Maltotriose | 213.722 | 2.286 |

FIG. 4 shows a simulated plasmagram for three trisaccharides (raffinose, melezitose and maltotriose) with the same elemental composition ($C_{18}H_{32}O_{16}$), but different 3D structures. Ion mobilities of trisaccharides in benzene at room temperature are estimated based on their published CCS values using the Mason-Schamp equation as shown in Table 3.

In simulations, ions entering the drift chamber were randomly distributed radially within a circle of 4 mm diameter. With a typical nano-ESI plume size of tenths of millimeters, this assumption leaves enough room to accommodate a relatively large range of distances from an ESI emitter to the surface of a liquid. The initial sampling time was set to 100 ms and the high voltage ramp time was set to 1 s, which corresponds to the electric field scan rate ($\beta$) of 12 kV/cm·s. Each group had 10,000 ions. The liquid (benzene) flow velocity was set to 18 cm/s.

In an unexpected result, the liquid phase IMS results in higher resolving power than traditional IMS analyzers. As demonstrated in FIG. 4 the simulations indicate rapid baseline separation of the three trisaccharides with an IMS resolution exceeding 200.

Estimate for E/N Parameter

The parameter E/N, where E is electric field strength and N is gas number density, is another crucial IMS constraint in 'omics' applications. At high values of E/N above the so-called 'low-field limit', ion mobility K becomes dependent on the electric field.

Working above the low-field limit means that field heating can change the effective temperature of the ions, resulting in measurable fragmentation or isomerization. Severe effects for polyatomic ions have been reported below 4 Td (1 Td=$10^{-21}$ V·m$^2$). Equation (9) gives an estimate for E/N parameter of the proposed system:

$$\frac{E}{N} = \frac{1.2 \cdot 10^6 \text{ V/m}}{6.76 \cdot 10^{27} \text{m}^{-3}} = 0.18 \, Td \qquad (9)$$

Modern high-performance IMS instruments generally operate well above the low-field limit as seen from Table 4.

TABLE 4

Typical operating parameters for contemporary commercial instruments.

| Instrument and manufacturer | Operation principle | Typical E/N, Td |
|---|---|---|
| Synapt HDMS, Waters | TW-IMS | ≤160 |
| Synapt G2, G2-S and G2Si HDMS, Waters | TW-IMS | ≤155 |
| TIMS-TOF, Bruker | t-IMS | 45-85 |
| 6560 IMS-Q-TOF, Agilent Technologies | Low pressure Drift Time | 7-15 |
| IMS-TOF, Tofwerk | Drift Time | 1-2 |

In an embodiment of the present disclosure, with E/N of approximately 0.18 Td, offers high-performance IMS separation which is 'softer' than any other IMS instrument on the market today. A very low value of E/N can effectively minimize internal energy activation of ions in the IMS system thereby retaining the native folded conformations in solutions as discussed below.

Analysis of Native-Like Proteins and Protein Complexes

Electrospray ionization (ESI), a method of choice for applying mass spectrometry to study proteins and protein complexes, can gently transform solution-phase macromolecules into gas phase ions. In the ESI process both vibrational and rotational internal energy of a charged analyte is dissipated during the desolvation step when loosely bound solvent molecules detach from the analyte ion. Numerous studies indicate that proteins can preserve some features of their solution structure in the gas phase. For that reason, ESI-IMS or ESI-MS can be used as a tool to distinguish solution-phase protein conformations.

The ability to retain native-like structure in the gas phase is almost certainly protein dependent. It has been shown that collisional activation may disrupt the protein's structure in a way that may significantly change the outcome of experiments. In order to retain aspects of solution-phase conformations, protein ions need to be gently ionized, e.g., with electrospray ionization. If treated gently, aspects of the secondary structure, tertiary structure and quaternary structure of the protein complex can be retained. Protein folding and unfolding processes are highly dynamic with conformational transitions through numerous intermediate forms on time scales that range from picoseconds to seconds.

In an embodiment of the present disclosure, not only permits inhibition of thermal unfolding (denaturation) due to very low internal energy activation 'E/N' parameter but also provides an opportunity to reverse the process. Most unfolded proteins will re-fold to their native conformations once placed in a non-denaturing solvent environment (i.e., ambient temperature, neutral pH, and in the absence of chemical denaturants). Among a few known exceptions are the irreversible thermal denaturation of cytochrome c and tumor suppressor protein p53.

Various embodiments of the present disclosure enable liquid phase IMS to be used as an efficient tool to probe solution-phase protein conformations rather than a complex soup of numerous gas-phase co-existing intermediates caused by the 'harsh' conditions of other IMS analyzers.

Coupling to MS

In an embodiment of the present disclosure, liquid phase IMS allows simple interfacing of the proposed method with a variety of separation techniques including gas- and liquid-chromatography (GC and LC) using a variety of ionization methods including electrospray (ESI), atmospheric pressure photoionization (APPI) and atmospheric pressure chemical ionization (APCI). In liquid phase IMS connected to a mass spectrometer the drift chamber diameter may be reduced down to sub-millimeter dimension in order to match IMS flow rate with intake flow rate of a mass spectrometer.

In one embodiment of the present disclosure, the ionized sample molecules are transferred to a gas phase through a process of evaporation of the liquid media (i.e. desolvation). In another embodiment of the present disclosure the sample molecules leaving the drift chamber may be re-ionized by a second ionization source.

Chiral Separations

Another noteworthy aspect of the present disclosure is the breadth of potential applications through the introduction of various chemical additives to the liquid phase, including for example the challenging problem of chiral separations. Separation of enantiomers by IMS is possible through the introduction of chiral additives to separation media. Due to interactions between the enantiomers and the chiral modifier, the mobility of each enantiomer is differentially reduced enabling enantiomeric separation. According to the "Pirkle rule", a high number of such interactions is required to achieve meaningful separation of enantiomers, which excludes chiral analysis from the list of potential application for low pressure IMS systems. Even for an atmospheric pressure Drift Time IMS, only ~2% deviation in drift times between the enantiomers was observed with the chiral modifier (2-butanol at concentration of 10 parts per million) added into the drift gas. In the liquid phase, collisions are more frequent than in the gas phase (about 500 times), so a much greater separation of enantiomers is anticipated. The present disclosure enables chiral separations in a fraction of the time and cost of traditional chiral separation techniques.

Liquid Media

In various embodiments of the disclosure, the liquid phase can be introduced in various positions between the ionization source and the electrode with lowest potential in the pre-separation region. In one embodiment of the present disclosure, non-polar liquid such as benzene is a preferred separation media. In another embodiment of the present disclosure, polar additives are added to a separation fluid in order to enhance electrospray ionization efficacy. In yet another embodiment of the present disclosure chiral additives are added to the separation fluid to enhance separation efficiency of enantiomers. In yet another embodiment of the present disclosure chemical modifiers are added to the separation fluid to intentionally shift elution time for certain classes of chemical substances. In yet another embodiment of the present disclosure different additives may be combined together to improve the overall performance of the IMS system.

In an embodiment of the present disclosure liquid media may be recirculated through the drift chamber to reduce cost and chemical exposure rate. In another embodiment of the present disclosure liquid media may be partially or completely consumed through an evaporation process after a single pass through the drift chamber.

Grids

Figure 5A:
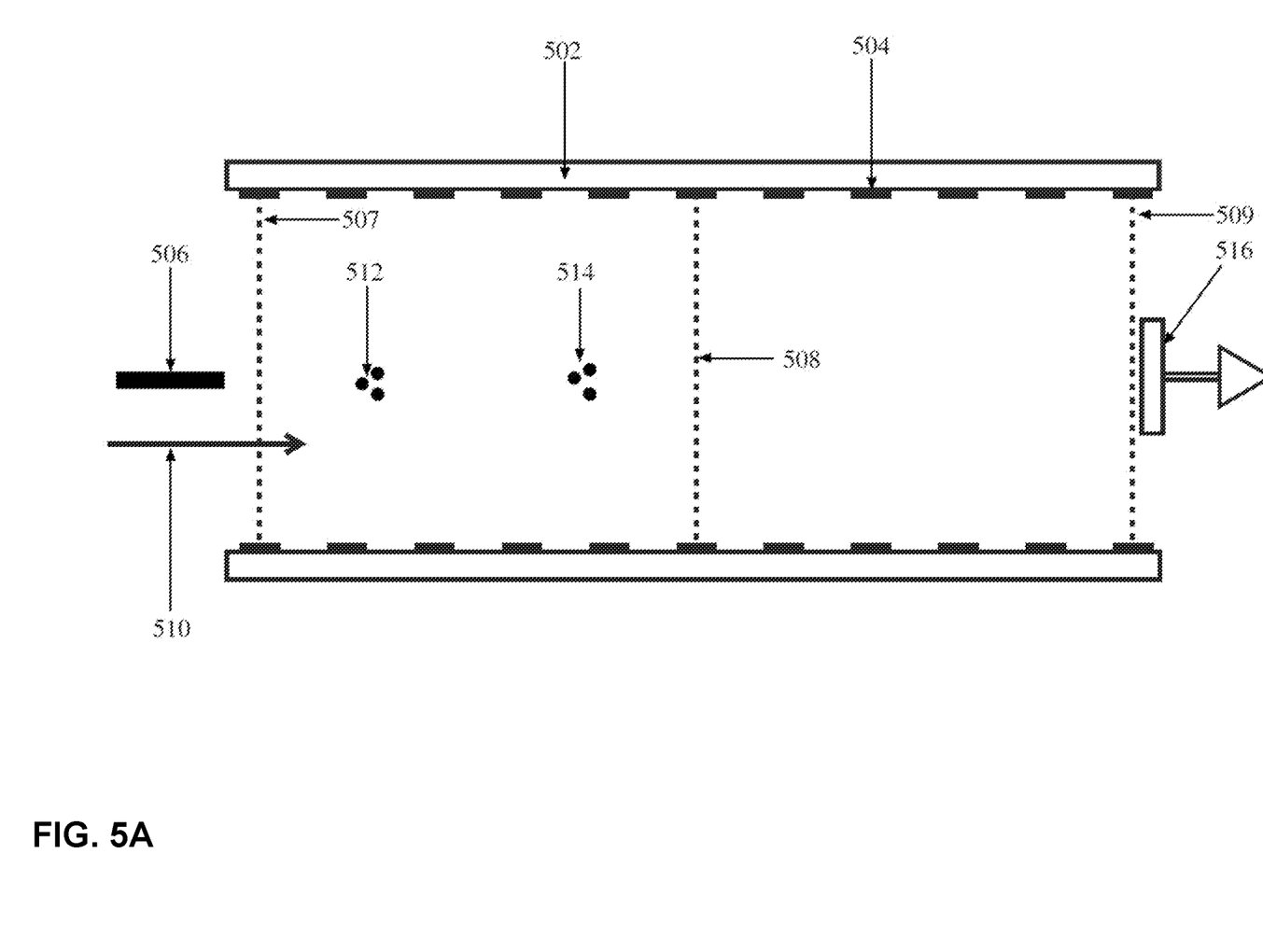
FIG. 5A shows the schematics of an exemplary IMS system with three (3) grids to shape the electric field distribution within the drift chamber, according to the techniques of this disclosure.

In one embodiment of the present disclosure, the first and last ring electrodes of the separation region of the drift chamber are fused with high transparency conducting grids to provide electric field uniformity at the ends of the ring stack. For example, FIG. 5A shows an embodiment of the present disclosure with three (3) grids 507, 508, and 509 wherein grid 508 is installed between regions within the drift chamber where an axial electric field gradient (EFG) increases linearly and where an axial electric field gradient (EFG) stays constant. In FIG. 5, the emitter tip 506 generates ions with higher mobility 512 and ions with lower mobility 514 in the vicinity of the emitter tip 506. Ions are then transferred to the separation region either by means of a liquid flow, or an electric field, or both. The ions with high mobility 512 are biased towards the ionizer 506 and ions with lower mobility 514 are biased towards the ion detector 516 as a result of a balance between the retarding electric field generated by electrical potentials applied to a plurality of conductive electrodes 504 and the liquid flow 510.

After the time interval required for ions to reach their equilibrium positions, the ascending electric field in the separation region applied to the plurality of conductive electrodes 504 is reduced to allow ions 514 and then 512, by way of example, to strike an ion detector 516.

Figure 5B:
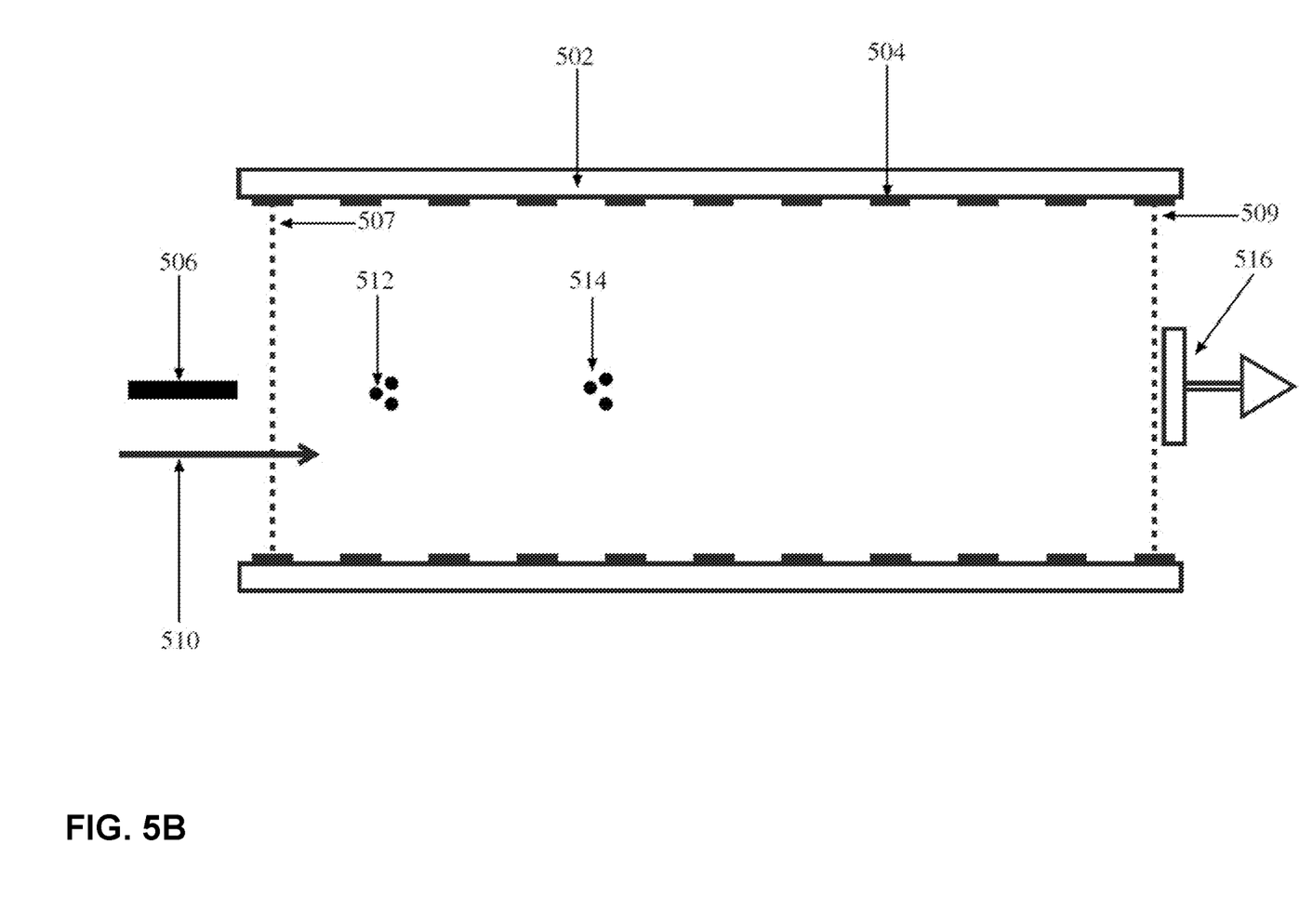
FIG. 5B shows the schematics of an exemplary IMS system with two (2) grids to shape the electric field distribution within the drift chamber, according to the techniques of this disclosure.
Figure 5C:
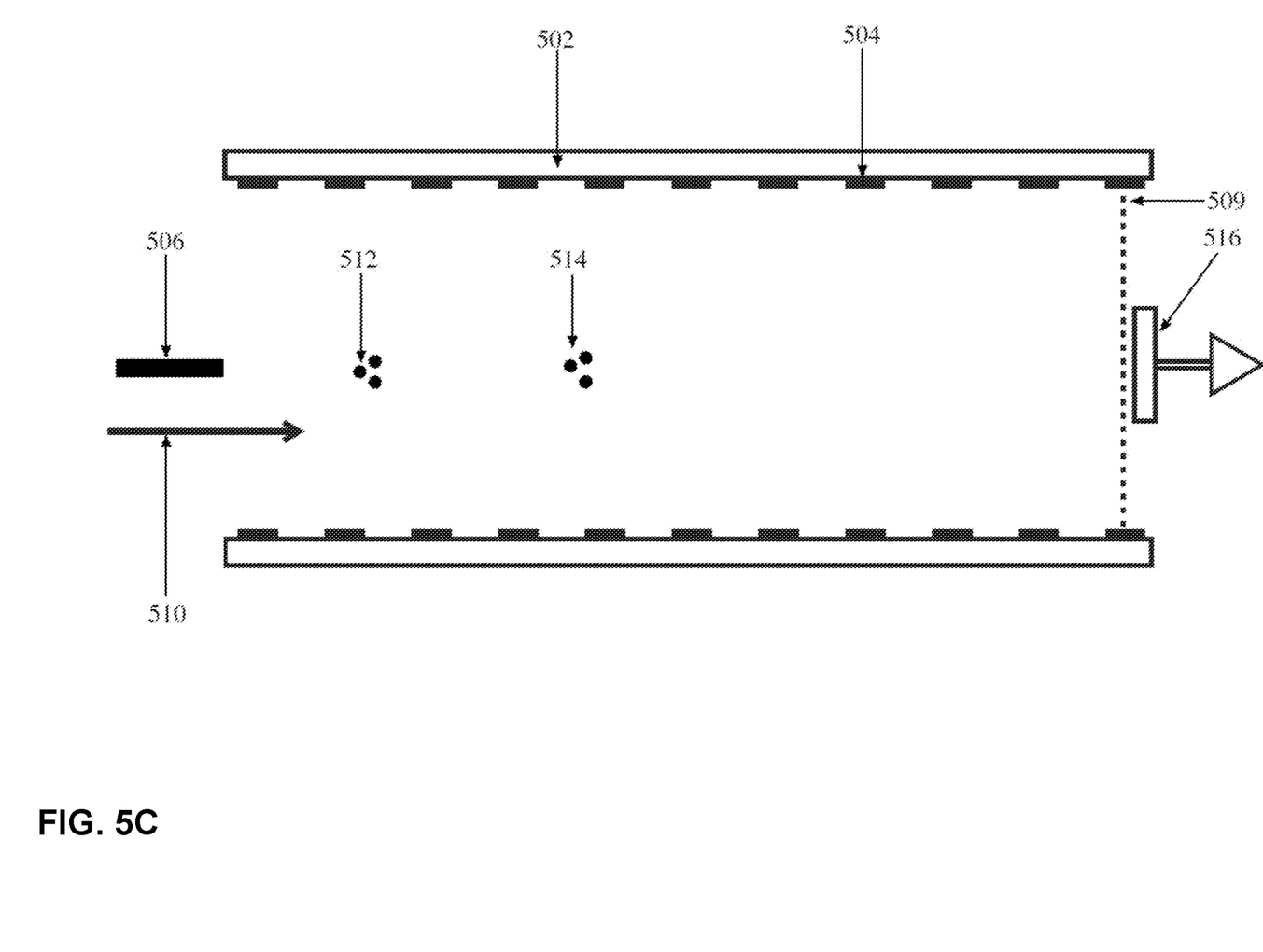
FIG. 5C shows the schematics of an exemplary IMS system with one (1) grid to shape the electric field distribution within the drift chamber, according to the techniques of this disclosure.

For example, FIG. 5B shows an embodiment of the present disclosure with two (2) grids 507 and 509. For example, FIG. 5C shows an embodiment of the present disclosure with only one (1) grid 509 in order to shield a Faraday detector from image current induced by approaching ions. In yet another embodiment of the present disclosure a series of high transparency conducting grids are provided in the region where an axial electric field gradient (EFG) stays constant.

Electric Field

In one embodiment of the present disclosure, the electric field is defined by potentials applied to the plurality of conductive electrodes. In another embodiment of the present disclosure, the electric field is defined by a potential applied to a single electrode with varying distance from conductive surface to an axial center line (for example the electrode having a horn or a funnel shape). In yet another embodiment of the present disclosure, the electric field is defined by a DC electric current flowing through a liquid (for example a liquid with polar additives). In an embodiment of the disclosure, the electric field is only in the separation region. In an alternative embodiment of the disclosure, the electric field extends beyond the separation region. In a further embodiment of the disclosure, the electric field is throughout the drift chamber. The electric field may be generated as described above with respect to system 100, or using other techniques.

In one embodiment the drift chamber comprises a first and second partition, wherein the inlet is located within the first partition. The combination of two partitions allows an ionization source to deliver ions into the separation region by means of an electric field and makes it possible to employ a variety of gas-phase ionization sources including electrospray (ESI), atmospheric pressure photoionization (APPI) and atmospheric pressure chemical ionization (APCI).

In another embodiment, the drift chamber comprises only the second partition. In such an embodiment, ions are delivered to the separation region by means of a liquid flow and consequently only liquid phase ionization sources are feasible.

The first partition and the second partition may be separated in space, or may be separated in time, or may be a combination of separated in time and space.

Method

Figure 6:
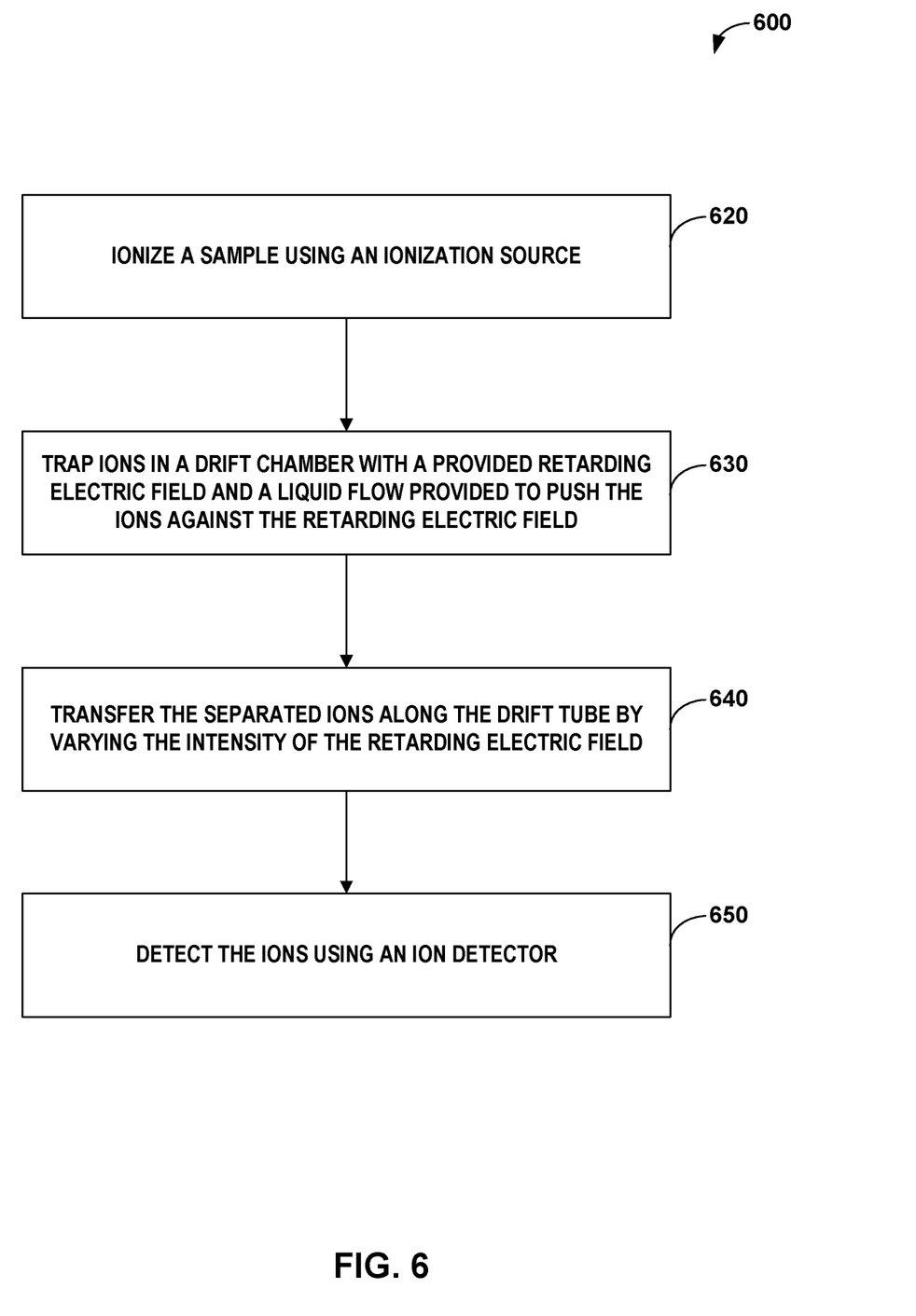
FIG. 6 is a flow diagram of an example method for an IMS-based detection method, according to the techniques of this disclosure.

FIG. 6 is a flow diagram of an exemplary method 600 for IMS-based detection, using an ion mobility device, according to the techniques of this disclosure. At an ionization step 620, the sample having an analyte is ionized using an ionization source to generate ions. The ions are introduced into a separation region of a drift chamber. At a trapping step 630, the ions are trapped for a duration in a drift chamber comprising a plurality of electrodes. During the trapping step 630, ascending electrical potentials are applied to electrodes of the drift chamber to generate a retarding electric field in the separation region 230 and a liquid flow is provided to push the ions against the retarding electric field in the separation region 230. The described combination of the retarding electric field in the separation region 230 and the liquid flow pushing the ions against the retarding electric field in the separation region 230 results in ion separation focusing based on the different ion mobilities to certain locations laterally along the center axis of the drift chamber. At a transferring step 640, spatially focused ion ensembles (or "clusters") are transferred along the drift chamber by varying the intensity of the retarding electric field in the separation region 230. At a detecting step 650 the ions are striking the ion detector 218 in decreasing mobility order. The time resolved measurement of an electrical current generated by ions striking an ion detector 218 generates an ion mobility spectrum.

To the extent not already described, the different features and structures of the various embodiments may be used in combination with each other as desired. That one feature may not be illustrated in all of the embodiments is not intended to be construed as limiting. Thus, the various features of the different embodiments may be mixed and matched as desired to form new embodiments, whether or not the new embodiments are expressly described. All combinations or permutations of features described herein are covered by this disclosure.

The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the systems, methods, and devices have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and devices provided herein. Additional advantages and modifications will readily be apparent to those skilled in the art. Therefore, the techniques of this disclosure, in their broader aspects, are not limited to the specific details, the representative system, method, or device, and illustrative examples shown and described. Accordingly, departures may be made from such details without departing from the spirit or scope of the applicant's general inventive concept. Thus, this application is intended to embrace alterations, modifications, and variations that fall within the scope of the appended claims. Furthermore, the preceding description is not meant to limit the scope of the claims. Rather, the scope of the invention is to be determined by the appended claims and their equivalents.

The techniques described herein may be implemented in hardware, software, firmware, or any combination thereof. Various features described as modules, engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. An ion mobility spectrometer comprising:
    an ionization source configured to generate ions from an analyte;
    a drift chamber with a separation region configured to receive the ions;
    a flow controller configured to direct, at a velocity, a liquid flow of a separation media comprising a non-polar liquid through the separation region to apply first forces to the ions within the separation region of the drift chamber;
    an electric field controller configured to use an electric field with a non-zero gradient to apply second forces to the ions within the separation region of the drift chamber, the second forces counter the first forces;
    a computing device configured to modify one or more of (1) the velocity of the liquid flow by directing the flow controller to modify the velocity of the liquid flow, or (2) the electric field by directing the electric field controller to modify the electric field; and
    an ion detector configured to detect, after the modification of the one or more of the velocity of the liquid flow or the electric field, the ions to generate a signal.

2. The ion mobility spectrometer of claim 1, wherein the electric field comprises a retarding DC electric field to retard movement of the ions within the separation region, the movement of the ions responsive to the first forces.

3. The ion mobility spectrometer of claim 1,
    wherein the ions comprise first ions and second ions,
    wherein the first forces applied by the liquid flow and the second forces applied by the electric field cause the first ions to reach equilibrium at a first position in the separation region,
    wherein the first forces applied by the liquid flow and the second forces applied by the electric field cause the second ions to reach equilibrium at a second position in the separation region, the first position different than the second position.

4. The ion mobility spectrometer of claim 3,
    wherein, after the modification of the at least one of the velocity of the liquid flow or the electric field, the first ions strike the detector before the second ions because the first position is nearer to the ion detector than the second position.

5. The ion mobility spectrometer of claim 3,
    wherein, after the drift chamber receives the ions, the computing device waits a configurable amount of time to enable the first ions to the reach equilibrium and the second ions to reach equilibrium before modifying the at least one of the velocity of the liquid flow or the electric field.

6. The ion mobility spectrometer of claim 1,
    wherein the electric field has a first electric field profile to apply the second forces and the modified electric field has a second electric field to apply third forces to the ions, the second electric field profile having lower magnitudes than the first electric field profile across at least a portion of the separation region.

7. The ion mobility spectrometer of claim 1, wherein the electric field has a first electric field profile to apply the second forces and the modified electric field has a second electric field to apply third forces to the ions, the second electric field profile having higher magnitudes than the first electric field profile across at least a portion of the separation region.

8. The ion mobility spectrometer of claim 1, wherein a liquid of the liquid flow has a Reynolds number sufficient to create a velocity flow profile for the liquid flow within the separation region, the velocity flow profile having a parabolic shape with a flat central section having a uniform velocity to provide a nearly uniform force on ions at different radial positions in the flat central section.

9. The ion mobility spectrometer of claim 1, wherein the velocity of the liquid flow is toward the ion detector.

10. The ion mobility spectrometer of claim 1, wherein the drift chamber is configured to receive the ions at an inlet, and wherein the velocity of the liquid flow is toward the inlet.

11. The ion mobility spectrometer of claim 1, wherein the ions within the separation region are in liquid phase.

12. The ion mobility spectrometer of claim 1, where the liquid flow is a gravity-fed flow.

13. The ion mobility spectrometer of claim 1, wherein the ions comprise enantiomers, and wherein the liquid flow comprises chiral substances for chiral separation of enantiomers within the separation region.

14. The ion mobility spectrometer of claim 1, where the liquid flow has a Reynolds number of less than 2300.

15. The ion mobility spectrometer of claim 1, where the liquid flow has a Reynolds number between:
a lower limit of 2300; and
an upper limit of 4000.

16. The ion mobility spectrometer of claim 1, wherein the electric field is generated within the drift chamber by one or more of a plurality of electrodes, a shape of a charged surface, and a direct current (DC) current through a liquid medium used to generate the liquid flow.

17. The ion mobility spectrometer of claim 1, wherein the electric field and the liquid flow separate the ions laterally along the center axis of the drift chamber.

18. A method comprising:
ionizing an analyte to generate ions;
introducing the ions into a separation region of a drift chamber;
directing, at a velocity, a liquid flow of a separation media comprising a non-polar liquid through the separation region to apply first forces to the ions within the separation region of the drift chamber;
using an electric field with a non-zero gradient, applying second forces to the ions within a separation region of a drift chamber, the second forces counter the first forces;
modifying at least one of the velocity or the electric field; and
after modifying the at least one of the velocity or the electric field, detecting the ions at an ion detector to generate a signal.

19. The method of claim 18,
wherein the ions comprise first ions and second ions,
wherein the first forces applied by the liquid flow and the second forces applied by the electric field cause the first ions to reach equilibrium at a first position in the separation region,
wherein the first forces applied by the liquid flow and the second forces applied by the electric field cause the second ions to reach equilibrium at a second position in the separation region, the first position different than the second position.

20. A non-transitory computer-readable medium comprising instructions for causing processing circuitry to perform, using an ion mobility spectrometer, operations comprising:
ionizing an analyte to generate ions;
introducing the ions into a separation region of a drift chamber;
directing, at a velocity, a liquid flow of a separation media comprising a non-polar liquid through the separation region to apply first forces to the ions within the separation region of the drift chamber;
using an electric field with a non-zero gradient, applying second forces to the ions within a separation region of a drift chamber, the second forces counter the first forces;
modifying at least one of the velocity or the electric field; and
after modifying the at least one of the velocity or the electric field, detecting the ions at an ion detector to generate a signal.

21. The ion mobility spectrometer of claim 1, wherein the separation media comprises at least one polar additive.

* * * * *